(12) United States Patent
Werner et al.

(10) Patent No.: US 10,686,897 B2
(45) Date of Patent: Jun. 16, 2020

(54) METHOD AND SYSTEM FOR TRANSMISSION AND LOW-LATENCY REAL-TIME OUTPUT AND/OR PROCESSING OF AN AUDIO DATA STREAM

(71) Applicant: Sennheiser electronic GmbH & Co. KG, Wedemark (DE)

(72) Inventors: Norbert Werner, Hannover (DE); Konstantin Septinus, Peine (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 29 days.

(21) Appl. No.: 15/621,129

(22) Filed: Jun. 13, 2017

(65) Prior Publication Data

US 2017/0374164 A1    Dec. 28, 2017

(30) Foreign Application Priority Data

Jun. 27, 2016  (DE) .................. 10 2016 111 743

(51) Int. Cl.
| | |
|---|---|
| *H04L 29/08* | (2006.01) |
| *H04L 12/26* | (2006.01) |
| *H04L 29/06* | (2006.01) |
| *H04J 3/06* | (2006.01) |
| *H04W 72/04* | (2009.01) |

(52) U.S. Cl.
CPC ............ *H04L 67/18* (2013.01); *H04J 3/0658* (2013.01); *H04L 43/087* (2013.01); *H04L 65/4084* (2013.01); *H04L 65/80* (2013.01); *H04L 69/08* (2013.01); *H04W 72/044* (2013.01); *H04L 43/10* (2013.01)

(58) Field of Classification Search
CPC ....... H04L 67/18; H04L 43/087; H04L 69/08; H04L 65/80; H04L 43/10; H04J 3/0658; H04W 72/044
USPC ...................................................... 370/230.1
See application file for complete search history.

(56) References Cited

U.S. PATENT DOCUMENTS

| | | | |
|---|---|---|---|
| 6,735,192 B1 | 5/2004 | Fried et al. | |
| 7,680,153 B2 * | 3/2010 | Ma ................. | H04N 21/23406 370/503 |
| 7,710,982 B2 * | 5/2010 | Ohmuro ............. | G10L 19/005 370/395.64 |
| 2006/0062338 A1 | 3/2006 | Chua | |
| 2006/0092918 A1 | 5/2006 | Talalai | |
| 2010/0290454 A1 | 11/2010 | Lundberg | |

(Continued)

*Primary Examiner* — Peter P Chau
(74) *Attorney, Agent, or Firm* — Haug Partners LLP

(57) ABSTRACT

A method for transmission and low-latency real-time output and/or processing of an audio data stream that is transmitted from at least one transmitter to at least one receiver over a jittering transmission path. The method includes a calibration for determining a distribution of latencies in transmission of packets of the audio data stream, whereby a group of packets of the audio data stream is used as calibration packets and wherein a reference time grid and an offset of a fastest calibration packet are determined. Then, a shift of an output time grid for audio output and/or processing, based on the reference time grid and the determined offset of the fastest calibration packet, and the audio packets of the audio data stream are provided according to the output time grid for audio output and/or processing.

24 Claims, 3 Drawing Sheets

(56) References Cited

U.S. PATENT DOCUMENTS

2015/0172197 A1  6/2015 Sun et al.
2015/0350099 A1  12/2015 Sun et al.

* cited by examiner

METHOD AND SYSTEM FOR TRANSMISSION AND LOW-LATENCY REAL-TIME OUTPUT AND/OR PROCESSING OF AN AUDIO DATA STREAM

The present application claims priority from German Patent Application No. 10 2016 111 743.9 filed on Jun. 27, 2016, the disclosure of which is incorporated herein by reference in its entirety.

FIELD OF THE INVENTION

It is noted that citation or identification of any document in this application is not an admission that such document is available as prior art to the present invention.

The present invention concerns a method and a system for transmission and low-latency output and/or processing of an audio data stream from at least one transmitter to at least one receiver via a jittering transmission path.

Wire-bound or wireless transmission from an audio data streaming source, or transmitter, to an audio streaming sink, or receiver, has typically a jittering transmission path. Jitter means that there are deviations in transmission latency of each network packet or audio block.

FIG. 1 shows a variation of transmission latencies of packets of an audio data stream. The X-axis represents the transmission latency UL and the Y-axis represents the number A of concerned packets. As depicted in FIG. 1, the transmitted packets have different transmission latencies. The latency L1 of the fast (i.e. early arriving) packets can differ significantly from the latency Ln of the slow (i.e. late arriving) packets. The difference between the fastest and the slowest (or slowest accepted) packet can be regarded as jitter window.

For a continuous output of a transmitted audio stream, the audio streaming receiver (sink) must have an intermediate buffer, namely a jitter buffer. In the jitter buffer, the received packets of the audio data stream are (intermediately) stored. When the audio streaming receiver receives the first audio packet, the actual transmission latency is typically unknown. Thus, it is assumed that the first audio packet is an early packet and that it must be delayed by the length of the jitter buffer before being output. If this assumption is true, then the audio stream can be output with the lowest possible latency. But if the first audio packet is one of the slower packets, the output latency is unnecessarily increased, up to the length of the jitter buffer. Thus, the latency of audio output can vary, depending on the arrival time of the first audio packet.

SUMMARY OF THE INVENTION

It is an object of the present invention to provide a method, a receiver and/or a system for transmission of an audio data stream from at least one transmitter to at least one receiver via a jittering transmission path, which method, receiver and system reduce the latency of a real-time audio output or processing, respectively.

Thus, a method for transmission and real-time low-latency output and/or processing of an audio data stream transmitted from at least one transmitter to at least one receiver via a jittering transmission path is provided. A calibration is performed for determining a distribution of latencies during a transmission of data packets of an audio data stream, which data packets are used as calibration packets. For this purpose, a reference time grid is created that starts at an arrival time of a first calibration packet at the receiver and that has a grid spacing that corresponds to the transmission interval of the calibration packets. For subsequent calibration packets, an offset between their respective arrival time and a corresponding time slot in the reference time grid is determined. At the end of the calibration, an offset of a fastest (i.e. earliest) calibration packet and a difference between this offset and a jitter window length are determined. Then an output time grid for audio output and/or processing is determined that is shifted relative to the reference time grid by the determined difference. Thus, audio packets can be output according to the grid for audio output and/or processing at the end of the calibration. An advantage of the grid for audio output and/or processing over the reference grid is that it allows fastest possible output of the audio packets, or their minimum latency respectively.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
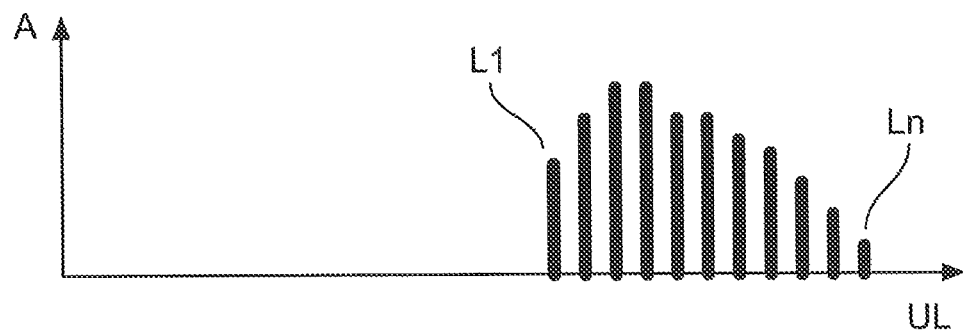
FIG. 1 is a diagram of varying transmission latencies of data in an audio data stream.
Figure 2A:
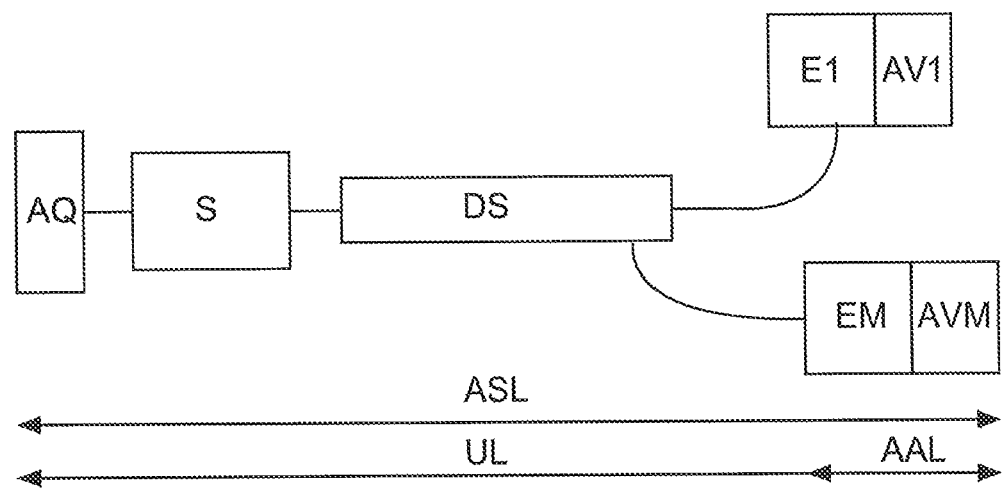
FIG. 2A is a block diagram of a transmitter and a receiver, connected over a jittering transmission path.

Depicted in FIG. 2A is a transmitter and a receiver according to the invention that are connected over a jittering transmission path. An audio source AQ provides an audio signal, which the transmitter S transmits over the jittering transmission path DS to the receivers E1, . . . , EM. The receivers E1, . . . , EM each have an audio processing unit AV1, . . . , AVM that allows real-time audio processing and/or audio play back. Due to the jittering transmission path DS, a transmission latency UL occurs. Due to the audio processing and/or audio play back, an additional audio output latency AAL occurs. The transmission latency UL and the audio output latency AAL add up to the total transmission latency of the audio stream.

For some applications or use cases it is important to minimize the audio stream latency, e.g. for live audio. An advantage of the invention is that it minimizes the latency that occurs due to the jitter buffer.

According to the invention, a group of packets of the audio data stream are used as calibration packets. These can be contiguous packets. Normally, the group may comprise between around one hundred and several thousand packets. In special cases, the group may comprise less than one hundred packets if the group is statistically relevant.

According to one aspect of the invention, the data transmission may use a wireless transmission path DS that is based on the Bluetooth protocol or on an IEEE802.11 protocol. However, the data transmission may use any (wired or wireless) jittering transmission path.

The audio data may be organized in blocks, where each audio packet may comprise a single block or a plurality thereof. Usually, the audio packets arrive with different latencies.

Figure 2B:
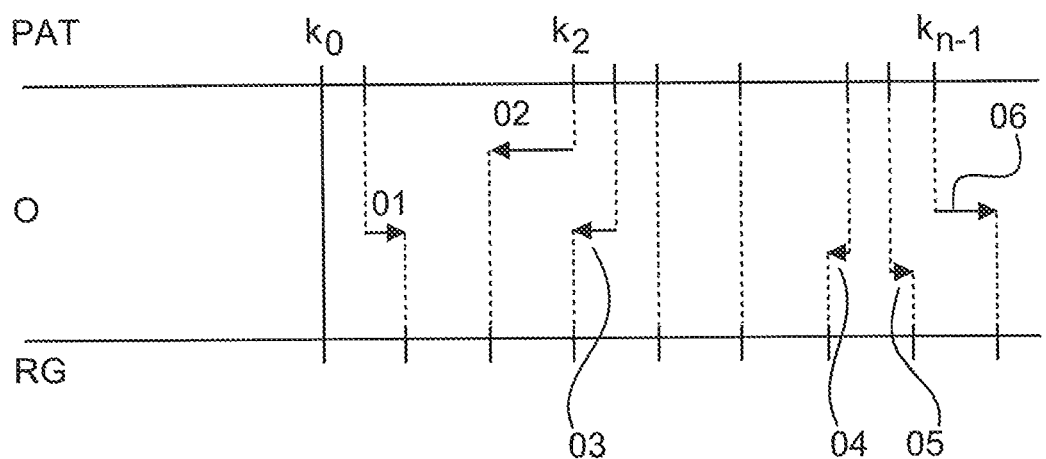
FIG. 2B is a diagram showing arrival times of packets and their offsets relative to a reference time grid.

FIG. 2B shows arrival times of packets and their offsets relative to a reference time grid. Packet arrival times PAT, the reference time grid RG and the offsets O are depicted in FIG. 2B. In particular, six offsets O1, . . . , O6 of calibration packets $k_0$-$k_{n-1}$ are shown. The first of the offsets O1 is positive while the second, third and fourth offsets O2,O3,O4 are negative.

Using the offsets, it can be determined whether the respective packet is a fast (i.e. early) or a slow (i.e. late) packet. Further, this information can be used to create an optimal time grid for audio output and/or processing. This time grid is optimal with respect to the latency that occurs due to the jitter buffer, namely by minimizing this latency. In particular, the audio output and/or processing of a slow packet can be launched earlier than for a fast packet.

Figure 3:
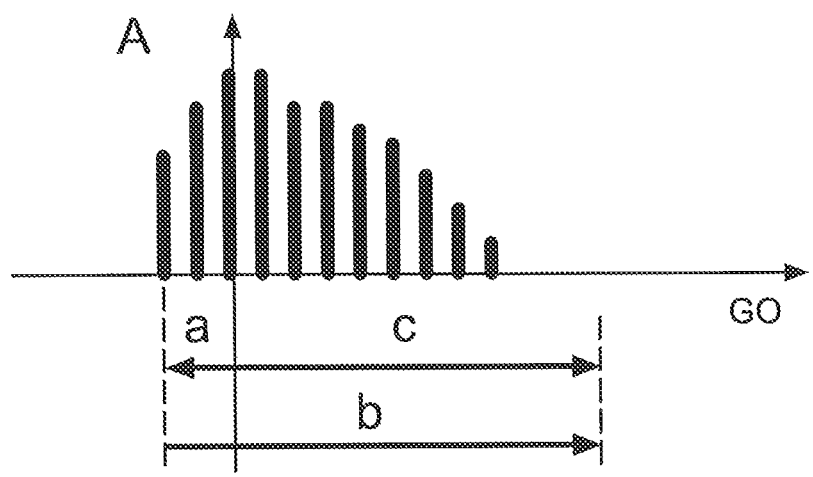
FIG. 3 is a histogram of calibration packet offsets.
Figure 4:
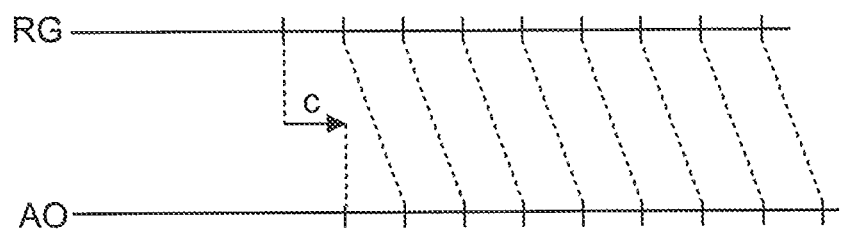
FIG. 4 is a diagram showing a difference between the reference time grid and the output time grid for audio output and/or processing.

FIG. 3 shows a histogram of calibration packet offsets GO of calibration packets $k_0$-$k_{n-1}$ according to the invention. Herein, "a" is the time difference from the origin of the histogram to the minimum latency. The length of the jitter window is "b". The difference between the jitter window "b" and the minimal offset "a", i.e. the offset of the fastest calibration packet, is "c". It corresponds to the time difference between the reference time grid RG and the optimal time grid AO for audio output and/or processing. FIG. 4 shows this difference in a diagram. Thus, according to the invention, the optimal time grid AO for audio output and/or processing can be created from the reference time grid RG and the time difference "c". The length b of the jitter window can be determined from the histogram according to FIG. 3 during calibration, or it can be a predetermined fixed value, e.g. a length of the jitter buffer or a predefined maximum value.

After the calibration (data packets $k_0$-$k_{n-1}$), audio packets $a_0$-$a_2$ can be transmitted in the new, optimized time grid. The calibration packets $k_0$-$k_{n-1}$ may also comprise audio data. For the first audio packet $a_0$ after the calibration phase, an offset $d_{a0}$ relative to the reference time grid RG may be determined. Based on this offset $d_{a0}$ and the difference "c", a temporal shift of the first audio packet after the calibration phase relative to the audio output time grid can be determined according to:

$$d = c - d_{a0}.$$

The first audio packet can then be output with a delay d, i.e. the first audio packet can be output immediately with the determined output time grid. Likewise, subsequent audio packets can be output with the determined output time grid.

While conventionally a fixed delay of d=b was used, the transmission latency according to the invention may correspond to the minimal transmission time plus the length of the defined jitter window. According to the invention, audio data may be output or processed as early as possible, other than with conventional solutions.

Figure 5:
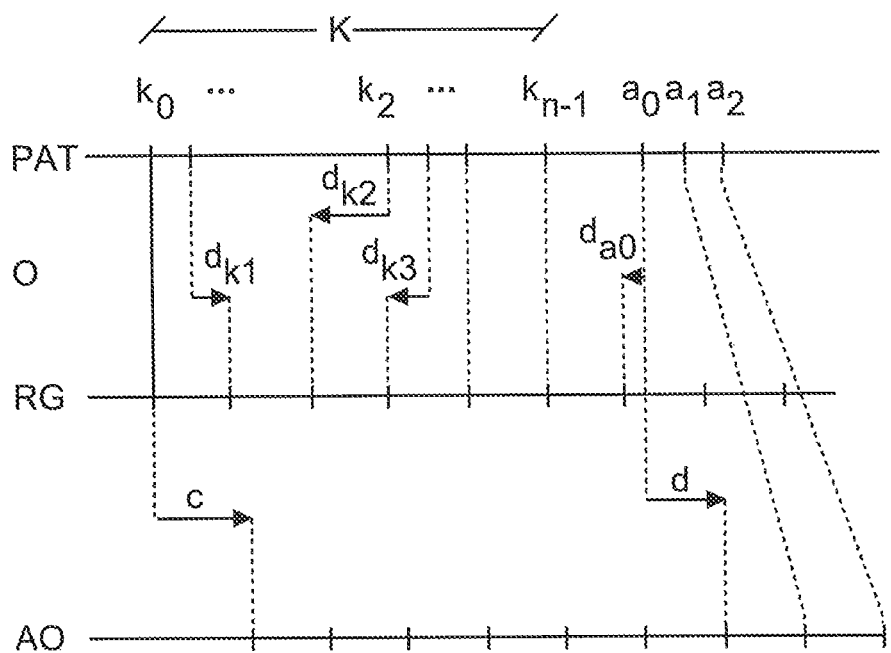
FIG. 5 is a diagram showing the output time grid for audio output and/or processing.

FIG. 5 shows an output time grid for audio output and/or audio processing according to the invention. First, the calibration packets $k_0$-$k_{n-1}$ may be transmitted. During the calibration K, the offsets $d_{k1}$,$d_{k2}$,$d_{k3}$ and particularly the offset "a" of the fastest calibration packet may be determined. After the calibration K, the temporal shift "c" of the desired time grid AO for audio output and/or processing may be determined from the offset "a" of the fastest calibration packet, as described above. The time grid AO can be generated by shifting the reference time grid RG by an amount of "c", or by determining the temporal shift of the first data packet $a_0$ relative to the reference time grid RG and then delay the output of the first audio packet by d, where d is determined as described above. In principle, this may be repeated for determining the individual delays of subsequent audio packets. But it is also possible to transmit the subsequent packets $a_1$, $a_2$, . . . of the audio stream independent from their offsets, simply according to the output time grid AO.

According to an aspect of the invention, packets may be not accepted: a packet may be discarded if its determined offset is too large, i.e. the jitter is outside the jitter window.

Figure 6:
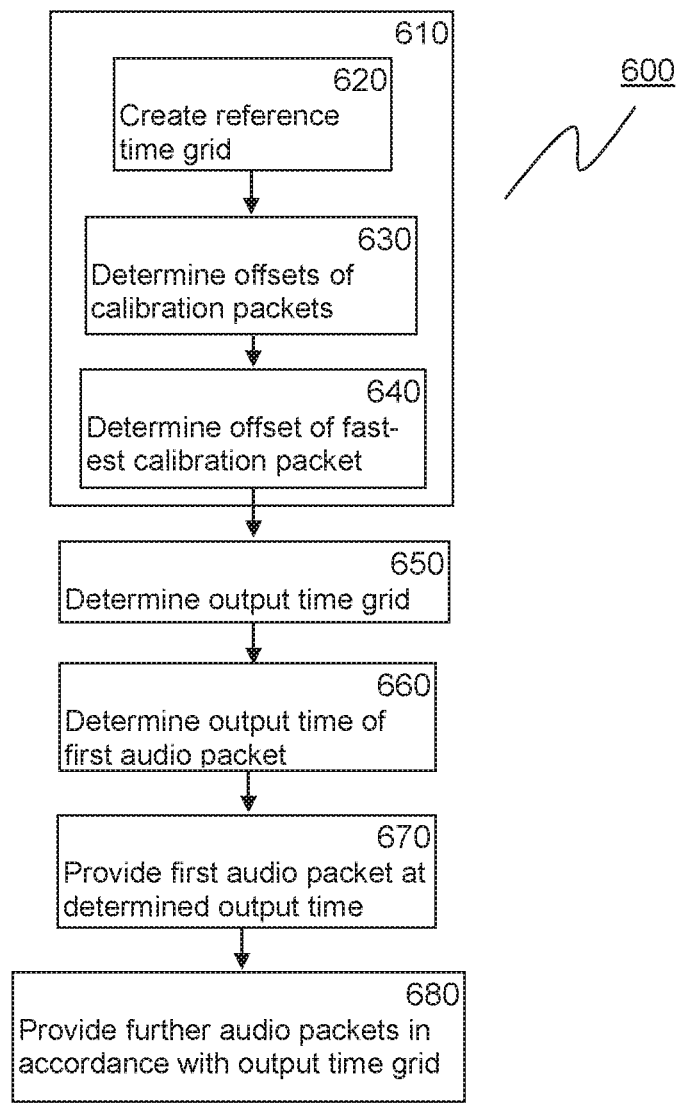
FIG. 6 is a flow chart of a method according to the invention.

FIG. 6 shows a flow chart of a method for transmission and low-latency real-time output and/or processing of an audio data stream that is transmitted from at least one transmitter S to at least one receiver E1,EM over a jittering transmission path DS, according to an embodiment. The method 600 comprises the following steps: First a calibration is performed 610 for determining a distribution of latencies in transmission of packets of the audio data stream, whereby a group of packets of the audio data stream is used as calibration packets. This is done by generating 620 a reference time grid that starts at the reception of the first calibration packet at the at least one receiver, and that has a grid width that corresponds to the transmission interval of the calibration packets, further by determining 630, for subsequent calibration packets, offsets between their arrival time and a corresponding (e.g. closest) time of the reference time grid, and determining 640 the fastest calibration packet and its offset "a" relative to the reference time grid and a first difference "c=b−a" between the length of a jitter window "b" and the offset "a" of the fastest calibration packet. Then, the output time grid AO for audio output and/or processing is determined 650, which is shifted by the determined first difference "c" relative to the reference time grid RG. For the first audio packet, a delay "d" relative to its arrival time for audio output and/or processing can be determined 660 based on the offset $d_{a0}$ of the audio packet relative to the reference time grid and the determined difference "c". The first audio packet is then provided or output 670 with a delay "d" to meet a time of the output time grid AO for audio output and/or processing. The subsequent audio packets of the audio data stream are then output 680 according to the output time grid for audio output and/or processing.

As described above, the delay $d_n$ of an audio packet $a_n$ relative to its reception time can be determined as a difference between the first difference c and the offset $d_{a0}$ of the respective audio packet relative to the reference time grid, according to:

$$d_n = c - d_{an}.$$

In one embodiment, the length of the jitter window "b" may be predetermined or correspond to a predetermined buffer length. In another embodiment, the length of the jitter window "b" can be determined during the calibration process and may correspond e.g. to the temporal difference between the fastest and the slowest calibration packet.

In an embodiment, the calibration packets may comprise audio data. In an embodiment, the calibration packets may comprise other data such as e.g. configuration data. The calibration packets may be output conventionally, e.g. with latencies that are higher than the audio packet latencies after calibration. A transition from the calibration packets with higher latency to the audio packets with lower latency can be achieved e.g. by increasing a sample rate for reading the jitter buffer for a short time or by discarding data after the calibration.

Figure 7:
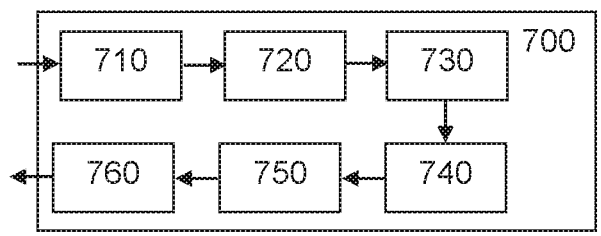
FIG. 7 is a block diagram of a receiver according to the invention.

FIG. 7 depicts in one embodiment a block diagram of a receiver E1 adapted for receiving an audio data stream over a jittering transmission path DS, wherein the receiver can output and/or process the audio data stream with low-latency and in real-time. The receiver E1 comprises reference time grid generation means 710 for generating a reference time grid RG that has a start at the beginning of a first calibration packet and a grid width that corresponds to the transmission interval of the packets of the audio data stream. The receiver E1 further comprises offset determining means 720 for determining an offset between packet arrival times and corresponding times of the reference time grid RG for the subsequent calibration packets. The receiver E1 further comprises minimum offset determining means 730 for determining the fastest calibration packet and its offset "a" relative to the reference time grid, and difference determining means 740 for determining a first difference "c" between a length of a jitter window "b" and the offset "a" of the fastest calibration packet. Moreover, the receiver E1 comprises output time grid determining means 750 for determining an output time grid AO for audio output and/or processing, which is delayed relative to the reference time grid RG by the first difference "c", and output means 760 for providing the audio packets in accordance with the output time grid AO for audio output and/or processing. Already the first audio packet $a_0$ may be provided with a reduced delay "d" that can be determined from the offset $d_{a0}$ of the first audio packet relative to the reference time grid RG and the first difference "c".

In an embodiment, a group of consecutive packets of the audio data stream is used as calibration packets, as shown in FIG. 2. In another embodiment, not all packet of a group of consecutive packets is used as calibration packets. In one embodiment, the new output time grid AO for audio output and/or processing is applied already from the first audio packet $a_0$ after the calibration phase K. In another embodiment, it is applied to later audio packets, e.g. due to further delays or other circumstances.

The above-mentioned means 710-760 may be implemented as hardware means or as one or more software-configured processors.

In one embodiment, the invention relates to a software program that when executed on a computer causes the computer to perform the steps of the method described above, and/or a computer readable data storage medium that has stored thereon such software program.

The receiver E1,EM may receive the audio data stream from any conventional transmitter S. The transmitter does not need to perform any special processing for the receiver to minimize the packet latency according to the invention. In particular, the transmitter may be in a wireless microphone, since the invention minimizes the transmission latency of the transmitted audio data. This is particularly important for real-time output such as live transmission of audio data, or for improved synchronization of audio data and video data.

According to one aspect, the invention concerns a system for transmission and real-time low-latency output and/or processing of an audio data stream with at least one transmitter S and at least one receiver E1,EM, whereby the audio data stream is transmitted over a jittering transmission path DS from the at least one transmitter to the at least one receiver, and whereby a group of packets of the audio data stream is used as calibration data packets. The receiver is adapted to perform a calibration for determining a distribution of a latency in the transmission of packets of the audio data stream, using the calibration packets, whereby the calibration is achieved by generating a reference time grid RG that starts at the reception of the first calibration packet and that has a grid width corresponding to the transmission interval of the calibration packets. The receiver is further adapted to determine for subsequent calibration packets offsets between their respective arrival time and a corresponding time of the reference time grid, an offset "a" of the fastest calibration packet relative to the reference time grid RG, a first difference c=b−a between the length of a jitter window "b" and the offset "a" of the fastest calibration packet. Further, the receiver is adapted to determine or generate an output time grid AO for audio output and/or processing that is delayed by the first difference "c" relative to the reference time grid RG, and to provide audio packets of the audio data stream in accordance with the output time grid AO for audio output and/or processing. A first audio packet is provided with a delay "d" that can be determined from its offset $d_{a0}$ relative to the reference time grid RG and the first difference "c".

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method for transmission and low-latency real-time output of a packetized audio data stream, comprising:
    transmitting the audio data stream from at least one transmitter to at least one receiver over a jittering transmission path;
    in the at least one receiver, writing received packets of the audio data stream into a jitter buffer;
    performing a calibration to determine a distribution of latencies in transmission of packets of the audio data stream, whereby a group of packets of the audio data stream is utilized as calibration packets, the calibration comprising:
        generating a reference time grid that starts at the reception of a first calibration packet by the at least one receiver, and that has a grid width that corresponds to a transmission interval of the calibration packets;
        determining, for subsequent calibration packets, offsets between their arrival times at the at least one receiver and corresponding expected arrival time of the reference time grid; and
        determining:
            a fastest calibration packet and an offset of the fastest calibration packet relative to the reference time grid; and a first difference between a length of a jitter window and the offset of the fastest calibration packet;

determining an output time grid for audio output and/or processing, the output time grid being shifted by the determined first difference relative to the reference time grid; and providing or outputting audio packets of the audio data stream from the jitter buffer according to the output time grid, wherein the audio packets are packets of the audio data stream that are subsequent to the calibration packets or subsequent to the subsequent calibration packets, and wherein a first audio packet is provided or output with a first delay, relative to an arrival time of the first audio packet, that is determined based on an offset of the first audio packet relative to the reference time grid and the determined first difference.

2. The method according to claim 1;

wherein a shift of the output time grid relative to the reference time grid is determined as a difference of said first difference and the offset of the first audio packet relative to the reference time grid.

3. The method according to claim 1;

wherein the length of the jitter window is predetermined or corresponds to a predefined jitter buffer length.

4. The method according to claim 1;

wherein the length of the jitter window is determined during the calibration and corresponds to a temporal difference between the fastest calibration packet and a slowest calibration packet.

5. The method according to claim 1;

wherein the audio packets and one or more of the calibration packets comprise audio data.

6. The method according to claim 1;
wherein the audio data stream is transmitted wirelessly.

7. The method according to claim 1;

wherein the calibration packets or the subsequent calibration packets are a group of consecutive packets of the audio data stream; and wherein the first audio packet is a first packet after the calibration packets or the subsequent calibration packets.

8. A receiver configured to receive a packetized audio data stream over a jittering transmission path, wherein the receiver is configured to output and optionally process the audio data stream with low-latency and in real-time, the receiver comprising a jitter buffer and one or more software-configurable processors storing program code that, when executed, cause the one or more software-configurable processors to act as:

a reference time grid generation means configured to generate a reference time grid based on a received group of packets of the audio data stream that are utilized as calibration packets during a calibration phase, the reference time grid having a start at a beginning of a first calibration packet and a grid width that corresponds to a transmission interval of the calibration packets of the audio data stream;

an offset determining means configured to determine offsets between packet arrival times at the receiver and corresponding times of the reference time grid for subsequent calibration packets;

a minimum offset determining means configured to determine a fastest calibration packet and an offset of the fastest calibration packet relative to the reference time grid;

a difference determining means configured to determine a first difference between a length of a jitter window and the offset of the fastest calibration packet;

an output time grid determining means configured to determine an output time grid for audio output and optionally for audio processing, the output time grid being delayed relative to the reference time grid by the first difference;

wherein at least the received group of audio packets are written into the jitter buffer; and an output means configured to read from the jitter buffer and provide audio packets in accordance with the output time grid for audio output and optionally for audio processing, wherein the audio packets are packets of the audio data stream that are subsequent to the calibration packets or subsequent to the subsequent calibration packets, wherein a first audio packet is provided, by the output means, with a delay, relative to an arrival time of the first audio packet, that is determined from an offset of the first audio packet relative to the reference time grid and said first difference.

9. The receiver according to claim 8;

wherein the one or more software-configurable processors is configured to determine a shift of the output time grid relative to the reference time grid as a difference of said first difference and the offset of the first audio packet relative to the reference time grid.

10. The receiver according to claim 8;

wherein the length of the jitter window is predetermined or corresponds to a predefined jitter buffer length.

11. The receiver according to claim 8;

wherein the one or more software-configurable processors is configured to determine the length of the jitter window during the calibration phase and corresponds to a temporal difference between the fastest calibration packet and a slowest calibration packet.

12. The receiver according to claim 8;

wherein the audio packets and one or more of the calibration packets comprise audio data.

13. The receiver according to claim 8;

wherein the audio data stream is received wirelessly by the receiver.

14. The receiver according to claim 8;

wherein the receiver is configured to utilize a group of consecutive packets of the audio data stream as the calibration packets or the subsequent calibration packets; and wherein the first audio packet is a first packet after the calibration packets or the subsequent calibration packets.

15. A system for transmission and real-time low-latency output of a packetized audio data stream, the system comprising:

at least one transmitter;

at least one receiver;

wherein the at least one transmitter is configured to transmit the audio data stream over a jittering transmission path to the at least one receiver;

wherein the at least one receiver comprises a jitter buffer and the at least one receiver is configured to:

utilize a group of packets of the audio data stream as calibration packets;

store at least audio packets received subsequently to the calibration packets in the jitter buffer; and perform a calibration for determining a distribution of a latency in transmission of packets of the audio data stream, utilizing the calibration packets;

wherein the calibration is achieved by generating a reference time grid, by the at least one receiver, that starts at the reception of a first calibration packet by the at least one receiver, and that has a grid width corresponding to a transmission interval of the calibration packets; and wherein the at least one receiver is further configured to:
determine, for subsequent calibration packets, offsets between their respective arrival times at the at least one receiver and corresponding times of the reference time grid;
determine a fastest calibration packet and an offset of the fastest calibration packet relative to the reference time grid;
determine a first difference between a length of a jitter window and the offset of the fastest calibration packet;
determine or generate an output time grid for audio output, the output time grid is delayed by the first difference relative to the reference time grid; and
provide audio packets of the audio data stream from the jitter buffer in accordance with the output time grid for audio output, wherein the audio packets are packets of the audio data stream that are subsequent to the calibration packets or subsequent to the subsequent calibration packets, and wherein a first audio packet is provided, by the at least one receiver with a first delay, relative to an arrival time of the first audio packet, that is determined from an offset of the first audio packet relative to the reference time grid and said first difference.

16. The system according to claim 15;
wherein a shift of the output time grid relative to the reference time grid is determined, by the at least one receiver, as a difference of said first difference and the offset of the first audio packet relative to the reference time grid.

17. The system according to claim 15;
wherein the length of the jitter window is predetermined or corresponds to a predefined jitter buffer length.

18. The system according to claim 15;
wherein the length of the jitter window is determined, by the at least one receiver, during the calibration and corresponds to a temporal difference between the fastest calibration packet and a slowest calibration packet.

19. The system according to claim 15;
wherein the audio packets and one or more of the calibration packets comprise audio data.

20. The system according to claim 15;
wherein the audio data stream is transmitted, by the at least one transmitter, wirelessly to the at least one receiver.

21. The system according to claim 15;
wherein said group of packets or the subsequent calibration packets is a group of consecutive packets; and
wherein the first audio packet is a first packet after the calibration packets or the subsequent calibration packets.

22. The method according to claim 6;
wherein the audio data stream is transmitted wirelessly based on a Bluetooth protocol or an IEEE 802.11 protocol.

23. The receiver according to claim 13;
wherein the audio data stream is received wirelessly based on a Bluetooth protocol or an IEEE 802.11 protocol.

24. The system according to claim 20;
wherein the audio data stream is transmitted wirelessly based on a Bluetooth protocol or an IEEE 802.11 protocol.

* * * * *